US008688038B2

(12) United States Patent
Byrne et al.

(10) Patent No.: US 8,688,038 B2
(45) Date of Patent: Apr. 1, 2014

(54) MOBILE COMMUNICATIONS DEVICE PROVIDING ENHANCED NEAR FIELD COMMUNICATION (NFC) MODE SWITCHING FEATURES AND RELATED METHODS

(75) Inventors: David James Byrne, Mississauga (CA); Orlin Vesselinov Stoev, Toronto (CA)

(73) Assignee: BlackBerry Limited, Waterloo, Ontario (CA)

( * ) Notice: Subject to any disclaimer, the term of this patent is extended or adjusted under 35 U.S.C. 154(b) by 182 days.

(21) Appl. No.: 13/359,894

(22) Filed: Jan. 27, 2012

(65) Prior Publication Data

US 2013/0196595 A1 Aug. 1, 2013

(51) Int. Cl.
*H04B 5/00* (2006.01)

(52) U.S. Cl.
USPC ........................................ 455/41.1; 455/41.2

(58) Field of Classification Search
USPC ............................... 455/41.1, 41.2
See application file for complete search history.

(56) References Cited

U.S. PATENT DOCUMENTS

| 2008/0233874 | A1 | 9/2008 | Rofougaran et al. |
| 2009/0164813 | A1 | 6/2009 | Tu et al. |
| 2010/0222010 | A1 | 9/2010 | Ozaki et al. |
| 2010/0325236 | A1 | 12/2010 | Savinen et al. |
| 2011/0059694 | A1 | 3/2011 | Audic |
| 2011/0268000 | A1 | 11/2011 | Kashikar et al. |
| 2012/0040608 | A1 | 2/2012 | Walker et al. |
| 2012/0040610 | A1 | 2/2012 | Moosavi et al. |
| 2012/0040611 | A1 | 2/2012 | Griffin et al. |

FOREIGN PATENT DOCUMENTS

| CN | 101964672 | 2/2011 |
| WO | 2006103516 | 10/2006 |

OTHER PUBLICATIONS

Bellotti et al., "ODECT: An RFID-Based Object Detection API to Support Application Development on Mobile Devices", Software Practice & Experience, Wiley & Sons, vol. 38, No. 12, Jan. 2008, pp. 1241-1259.
Jurdak et al., "Radio Sleep Mode Optimization in Wireless Sensor Netowrks", IEEE, vol. 9, No. 7, Jul. 2010, pp. 955-968.
U.S. Appl. No. 13/017,473, filed Jan. 31, 2011.
U.S. Appl. No. 13/241,615, filed Sep. 23, 2011.
U.S. Appl. No. 13/359,873, filed Jan. 27, 2012.

*Primary Examiner* — Creighton Smith
(74) *Attorney, Agent, or Firm* — Allen, Dyer, Doppelt, Milbrath & Gilchrist, P.A.

(57) ABSTRACT

A mobile communications device may include a near field communication (NFC) transceiver switchable between a plurality of modes including a first NFC mode and a second NFC mode, wherein the second NFC mode has a lower power consumption level associated therewith than the first NFC mode. The mobile communications device may further include a processor coupled with the NFC transceiver and capable of activating an application, switching the NFC transceiver to operate in the first NFC mode in response to activating the application, and switching the NFC transceiver to the second NFC mode based upon a failure to establish NFC communications within a threshold time of switching the NFC transceiver to the first NFC mode.

26 Claims, 4 Drawing Sheets

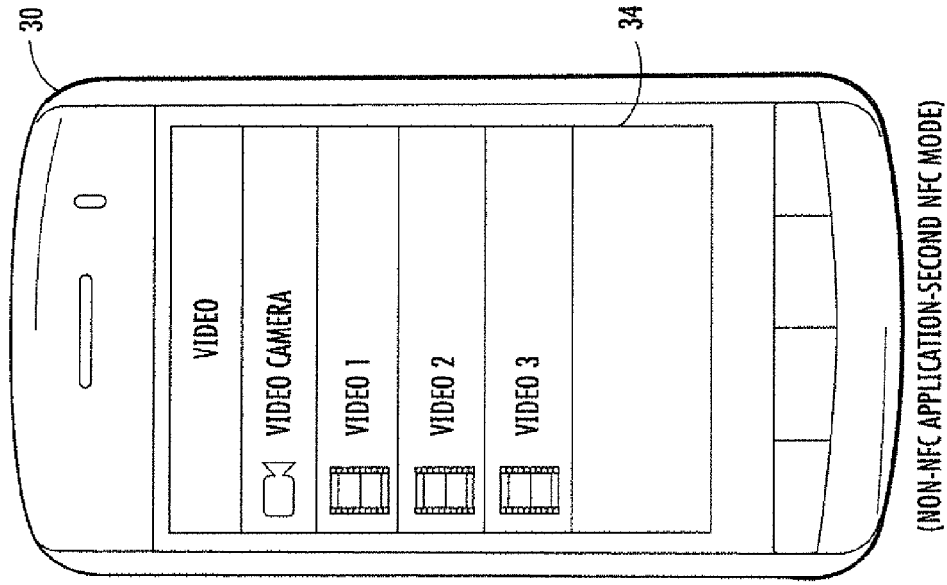
FIG. 4 (NON-NFC APPLICATION-SECOND NFC MODE)
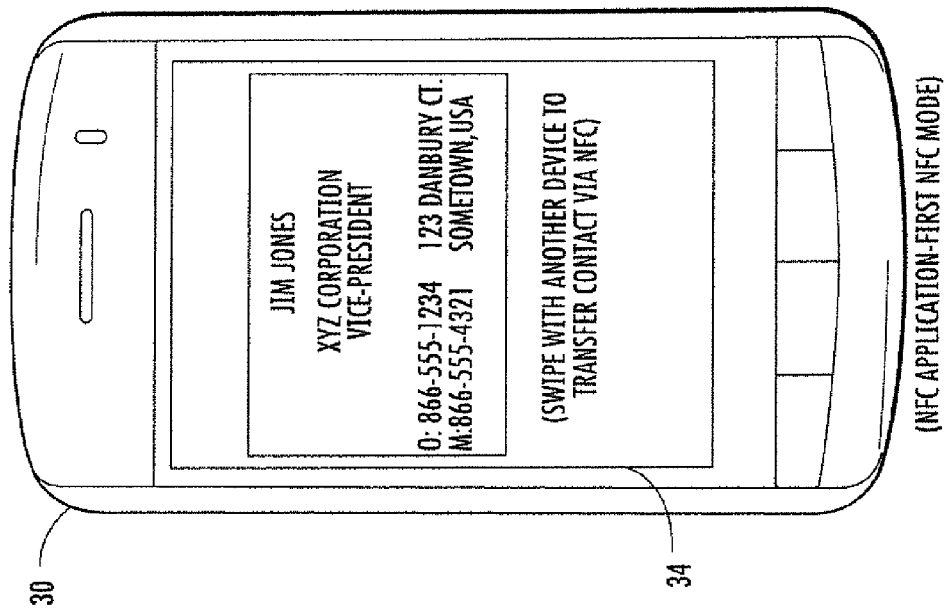
FIG. 3 (NFC APPLICATION-FIRST NFC MODE)

MOBILE COMMUNICATIONS DEVICE PROVIDING ENHANCED NEAR FIELD COMMUNICATION (NFC) MODE SWITCHING FEATURES AND RELATED METHODS

TECHNICAL FIELD

This application relates to the field of communications, and more particularly, to electronic devices and related methods that use near-field communication (NFC).

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multi-function devices usually allow electronic mail (email) messages to be sent and received wirelessly, as well as access the Internet via a cellular network and/or a wireless local area network (WLAN), for example.

Some mobile devices incorporate contactless card technology and/or near field communication (NFC) chips. NFC technology is commonly used for contactless short-range communications based on radio frequency identification (RFID) standards, using magnetic field induction to enable communication between electronic devices, including mobile wireless communications devices. These short-range communications include payment and ticketing, electronic keys, identification, device set-up service and similar information sharing. This short-range high frequency wireless communications technology exchanges data between devices over a short distance, such as only a few centimeters.

BRIEF DESCRIPTION OF THE DRAWINGS

FIGS. 3 and 4 are front views of example mobile devices illustrating different mobile device applications that may trigger switching between different NFC operating modes.

DETAILED DESCRIPTION

Figure 1:
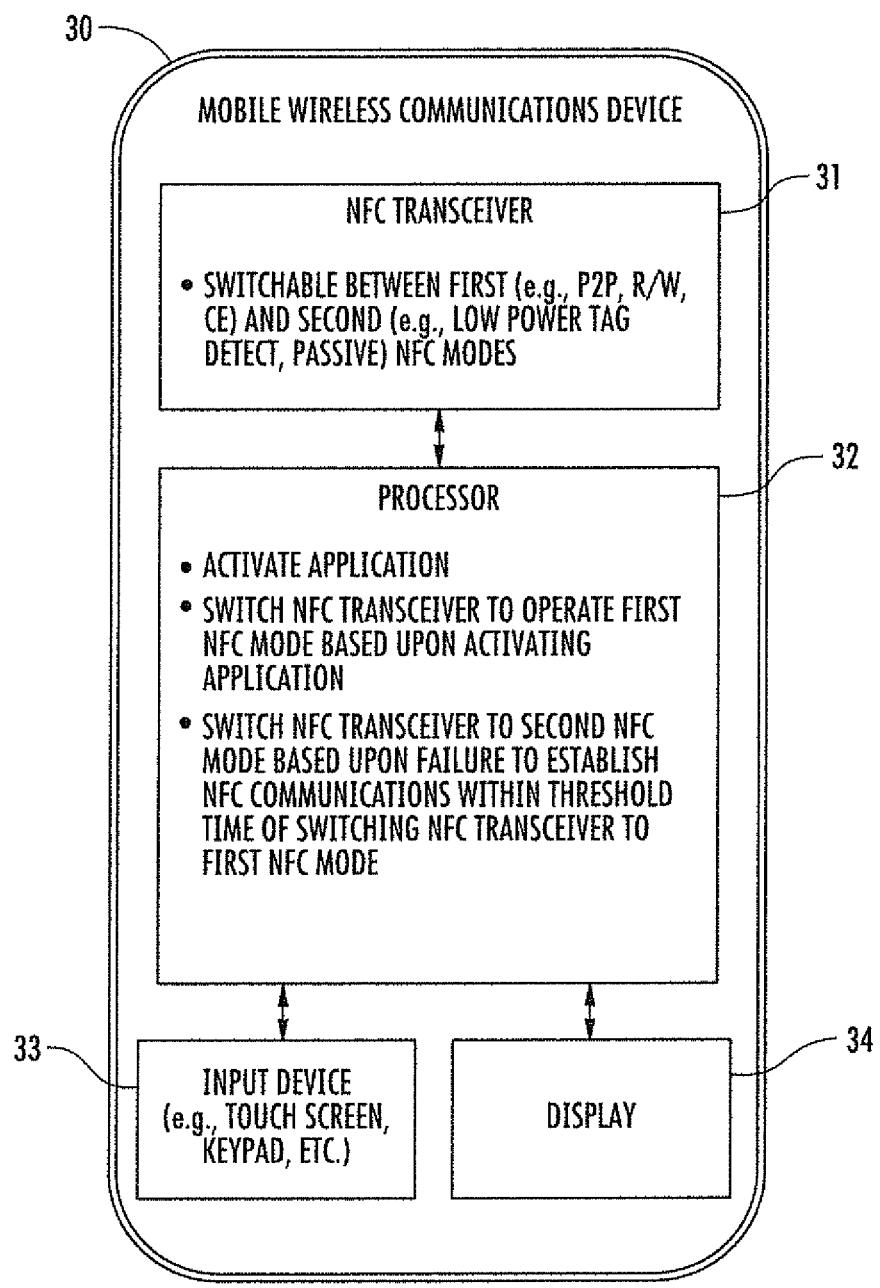
FIG. 1 is a schematic block diagram of a mobile communications device in accordance with one example aspect.

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Generally speaking, a mobile communications device is provided herein which may include a near field communication (NFC) transceiver switchable between a plurality of modes including a first NFC mode and a second NFC mode, wherein the second NFC mode has a lower power consumption level associated therewith than the first NFC mode. The mobile communications may further include a processor coupled with the NFC transceiver and capable of activating an application, switching the NFC transceiver to operate in the first NFC mode in response to activating the application, and switching the NFC transceiver to the second NFC mode based upon a failure to establish NFC communications within a threshold time of switching the NFC transceiver to the first NFC mode. Accordingly, this may advantageously provide a more responsive user experience, while reducing power consumption.

More particularly, the application may be capable of using the NFC transceiver, and the processor may be capable of switching the NFC transceiver to operate in the first NFC mode further in response to determining that the application is capable of using the NFC transceiver. By way of example, the application may be capable of using the NFC transceiver by invoking an NFC application programming interface (API). As such, the processor may be capable of switching the NFC transceiver to the first NFC mode in response to activating the application and the application invoking the NFC API.

By way of example, the first NFC mode may comprise at least one of a peer-to-peer (P2P) mode or a read/write (R/W) mode. Also, the second NFC mode may comprise a low power tag detect mode, a passive NFC mode, etc. Additionally, the first NFC mode may have a first scan rate associated therewith, and the second NFC mode may have a second scan rate associated therewith that is lower than the first scan rate, for example. The mobile communications device may further include an input device coupled with the processor, and the processor may be further capable of changing the threshold time based upon the input device. By way of example, the input device may comprise at least one of a touch screen or a keypad.

A related communications method is for a mobile communications device comprising a NFC transceiver switchable between a plurality of modes comprising a first NFC mode and a second NFC mode, wherein the second NFC mode has a lower power consumption level associated therewith than the first NFC mode. The method may include activating an application on the mobile communications device, switching the NFC transceiver to operate in the first NFC mode in response to activating the application, and switching the NFC transceiver to the second NFC mode based upon a failure to establish NFC communications within a threshold time of switching the NFC transceiver to the first NFC mode.

A related non-transitory computer-readable medium is also provided for a mobile communications device, such as the one described briefly above. The non-transitory computer-readable medium having computer-executable instructions for causing the mobile communications device to perform steps comprising activating an application on the mobile communications device, switching the NFC transceiver to operate in the first NFC mode in response to activating the application, and switching the NFC transceiver to the second NFC mode based upon a failure to establish NFC communications within a threshold time of switching the NFC transceiver to the first NFC mode.

Referring initially to FIG. 1, a mobile communications device 30 (also referred to as a "mobile device" herein) illustratively includes a near field communication (NFC) transceiver 31 and a processor 32 coupled with the NFC transceiver 31. By way of example, the NFC transceiver 31 may be implemented as an NFC chipset which may include other associated components such as an NFC controller, an embedded memory which may be configured as a secure element, etc., along with associated computer-executable instructions. The processor 32 may be considered as a baseband processor, and it may be implemented using a combination of hardware (e.g., microprocessor, etc.) and a non-transitory computer-readable medium having computer-executable instructions for performing the various operations noted herein. The processor 32 and NFC transceiver 31 may communicate via a designated communications channel, such as a JSR-177 communications channel, for example, although other suitable communications formats may also be used. Example mobile devices 30 may include portable or personal media players (e.g., music or MP3 players, video players, electronic book readers, etc.), portable gaming devices, portable or mobile telephones, smartphones, portable computers such as tablet computers, digital cameras, etc. The mobile device 30 further illustratively includes an input device 33 (e.g., a touch screen, keypad, buttons, track pad, track ball, etc.) and a display 34 coupled with the processor 32.

By way of background, NFC is a short-range wireless communications technology in which NFC-enabled devices are "swiped," "bumped" or otherwise moved in close proximity to communicate. In one non-limiting example implementation, NFC may operate at 13.56 MHz and with an effective range of several centimeters (typically up to about 4 cm, or up to about 10 cm, depending upon the given implementation), but other suitable versions of near field communication which may have different operating frequencies, effective ranges, etc., for example, may also be used.

Moreover, the NFC transceiver 31 may be operable in first and second NFC modes, where the second NFC mode has a lower power consumption level associated therewith than the first NFC mode. By way of example, the first NFC mode may be one of a peer-to-peer (P2P) mode or a read/write (R/W) mode, for example. In these modes, the NFC transceiver 31 may generate electromagnetic carrier field pulses for detecting and communicating with other types of NFC transceivers. However, when operating in such modes, the NFC transceiver 31 may consume a significant amount of power (e.g., several milliamps per second), which may lead to reduced battery life for the mobile device 30. As such, while this power consumption might be acceptable for short durations when the NFC transceiver 31 is actively communicating, it may be desirable to switch the NFC transceiver to the second, lower power NFC mode when NFC communication is not in use, or is unlikely to be used.

By way of example, the second NFC mode may comprise a NFC low power tag detect mode. By way of comparison, in a low power tag detect mode, the NFC transceiver 31 may similarly emit electromagnetic carrier field pulses, but of a relatively shorter duration than in the above-noted P2P or R/W modes, to detect a magnetic field change. That is, rather than attempting to engage in near field communication, which would require longer duration active mode pulses, the NFC transceiver 31 instead emits the shorter pulses for the purpose of determining relative movement with respect to objects in its vicinity. That is, metal or other materials which result in a given magnetic field measurement or reading by the NFC transceiver 31 when it enters a low power tag detect mode. Yet, when the NFC transceiver 31 and the surrounding object(s) are moved relative to one another, then the given field measurement will change. So, for example, if this measurement changes beyond a threshold level, then the NFC transceiver 31 may determine that the mobile device 30 has been moved, which may in some circumstances be indicative that NFC communication is desired. Another example of the second NFC mode may be a passive mode, or a mode in which power is not supplied to the NFC transceiver 31.

In the second NFC mode (e.g., low power tag detection mode), the NFC transceiver 31 may have a significantly lower power consumption than when operating in the first NFC scan mode. For example, in a low power tag detect mode, the NFC transceiver 31 may have a power consumption (e.g., current draw) in the micro amp per second range (e.g., approximately 15-150 µA).

In some embodiments, the first and second NFC modes may be similar but have different respective polling rates. For example, in some instances the first NFC mode and the second NFC mode may both be P2P or R/W modes, yet with a decreased lower polling or scan rate in the second NFC mode, for example. Moreover, the NFC transceiver 31 may be operated in a card emulation (CE) mode. In the CE mode, the NFC transceiver 31 operates as a passive device, meaning it does not emit electromagnetic field pulses but instead waits for a field from a reader device, thus emulating an unpowered NFC card when it is swiped with a reader. In some embodiments, the NFC transceiver 31 may cycle between R/W, P2P, and CE modes when it is awakened or activated to scan for (or be scanned by) another NFC device, such as upon being "awakened" from the low power tag detect mode. The NFC transceiver 31 may also switch or cycle between the low power tag detect mode and the CE mode when is it "asleep" or in stand-by in the second NFC mode.

Generally speaking, it is therefore desirable to switch the NFC transceiver 31 to the second NFC mode when NFC communication is not in use to thereby enhance battery life. Yet, this may result in a less responsive user experience, as it may otherwise take longer to recognize another NFC device, or this may require the user to manually initiate NFC communication (e.g., using the input device 33). To advantageously provide desired responsiveness and power conservation, the processor 32 may advantageously switch the NFC transceiver 31 to the first NFC mode when it determines that there is an enhanced likelihood that NFC communication will soon be required. In particular, NFC communication may be more likely to occur within a short period after the processor 32 switches to or activates a new or different application, such as opening a new application, or switching a background application to be the foreground or active application.

Figure 2:
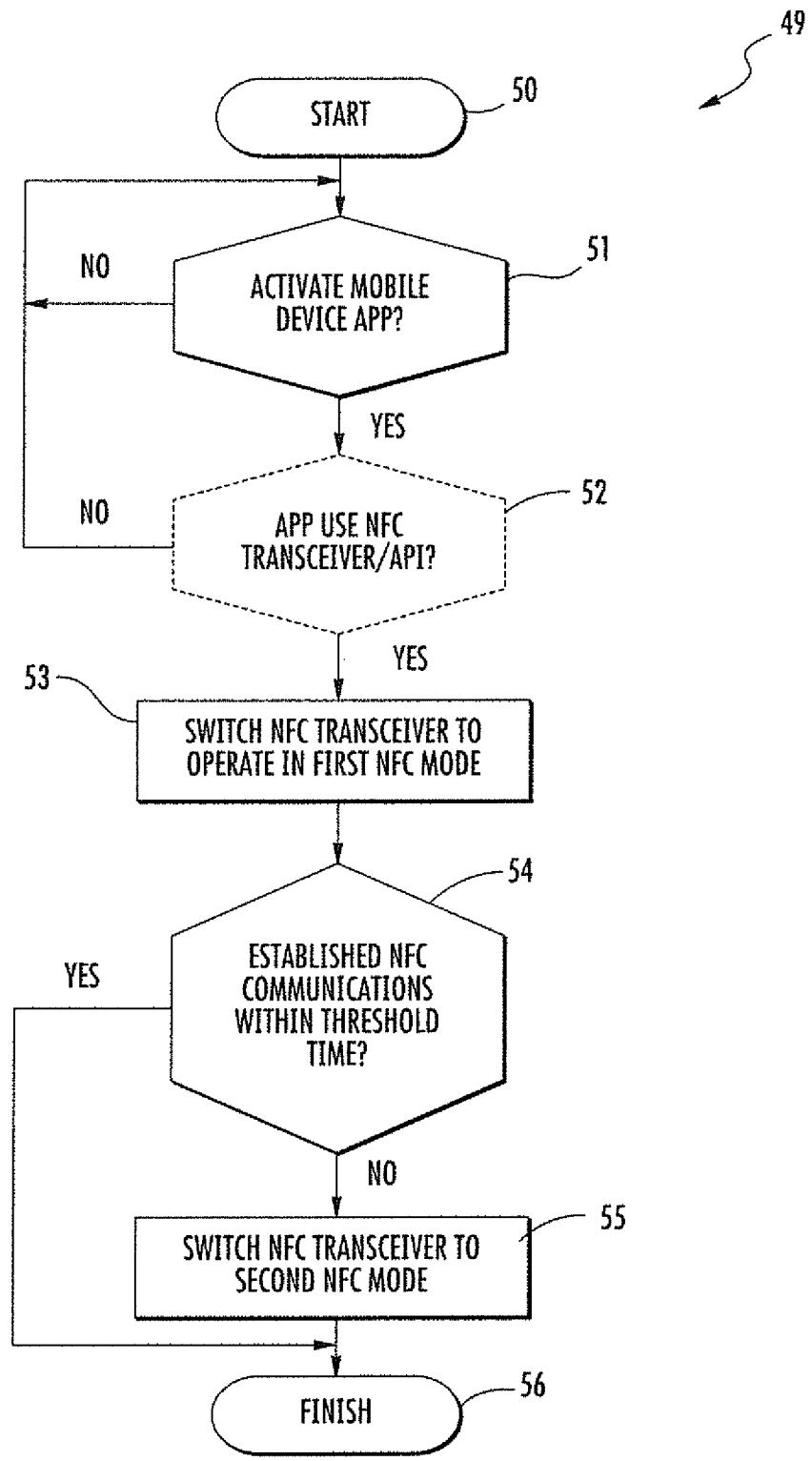
FIG. 2 is a flow diagram illustrating method aspects associated with the mobile communications device of FIG. 1.

Accordingly, beginning at Block 50 of the flow diagram 49 of FIG. 2, when the processor 32 activates a mobile device application (e.g., based upon the input device 33, etc.), at Block 51, the processor 32 may advantageously switch the NFC transceiver 31 to operate in the first NFC mode, at Block 53. Thus, for example, whenever the processor 32 runs a different or new application in the foreground, it may accordingly also switch the NFC transceiver 31 to operate in the first NFC mode. It should be noted that the processor 32 need not always switch applications based upon the input device 33. For example, an application switch may be based upon a calendar entry, an alarm, etc., which causes the processor 32 to run another application in the foreground. Activating an application may include starting up an application that was previously not running, or moving an application that was previously running in the background to be the foreground application.

For example, the processor 32 may cause the NFC transceiver 31 to switch to the first NFC mode based upon switching to mobile device applications running in the foreground that are capable of using the NFC transceiver 31, at Block 52. In accordance with another example implementation, the processor 32 may be capable of switching the NFC transceiver 31 to the first NFC mode based upon a given mobile device application using the NFC transceiver 31. By way of example, a mobile device application may use the NFC transceiver 31 by invoking an NFC application programming interface (API). Thus, for example, if the processor 32 activates a mobile application that invokes (or is capable of invoking, in some embodiments) the NFC API, then the NFC transceiver 31 may be switched to the first NFC mode.

Examples of different types of applications which may trigger switching of the NFC transceiver 31 to the first NFC mode are now described with reference to FIGS. 3 and 4. In the example of FIG. 3, an address book or contact application is open and being processed in the foreground (i.e., it is shown on the display 34) by the processor 32. In particular, a contact for Jim Jones is displayed on the display 34 by the address book application in FIG. 3. The address book application provides a user interface for selection of various contacts or electronic business cards to transmit to corresponding NFC-enabled devices via the NFC transceiver 31. As such, having the address book application (or other applications that utilize the NFC transceiver 31 or the API) in the foreground or active as shown in FIG. 3 may cause the processor 32 to switch the NFC transceiver 31 to the first NFC mode.

On the other hand, in the example of FIG. 4, the active or foreground application is a video application, which provides a user interface for reviewing stored video files and capturing new videos via a video camera feature. Since this particular example application is not configured for utilizing NFC communication (e.g., the NFC API), when the processor 32 switches to run this application as the active or foreground application, the processor 32 may allow the NFC transceiver 31 to remain in the second NFC mode (e.g., power off, passive, low power tag detect, etc.). However, as noted above, in some embodiments switching to an application which does not invoke the NFC transceiver 31 or NFC API may still result in the processor 32 switching the NFC transceiver 31 to the first NFC mode, if desired.

In another example embodiment, applications may be initially assumed to not require NFC communication when switched to the foreground, etc. (i.e., meaning the processor 32 does not cause the NFC transceiver 31 to initially switch to the first NFC mode). Yet, if the active or foreground application invokes the NFC API, for example, then the processor 32 may thereafter cause the NFC transceiver 31 to switch to the first NFC mode whenever this application is made active or brought to the foreground. That is, the processor 32 may "learn" which applications are used to invoke NFC communication, and thereafter switch the NFC transceiver 31 to the first NFC mode when a learned application becomes active or comes to the foreground. In this regard, NFC communication is considered to be most likely required when a user begins interacting directly with an NFC-aware application, so that switching of the NFC transceiver 31 to the first NFC mode is therefore appropriate.

Accordingly, the above-described approach may advantageously provide a more responsive experience, in that the NFC transceiver 31 will be placed in the first NFC mode when there is a switch between applications being run by the processor 32. Yet, to help avoid excessive power consumption in the event that the application switch is not to be accompanied by corresponding NFC communication, the processor 32 may also be capable of switching the NFC transceiver 31 to the second NFC mode based upon a failure to establish NFC communications within a threshold time of switching the NFC transceiver 31 to the first NFC mode, at Blocks 54-55, which concludes the method illustrated in FIG. 2 (Block 56). The threshold time may be a configurable value, which a user may change through an on-screen menu, for example. By way of example, the threshold time may typically be in a range of several seconds to several minutes, although longer durations may be used in some embodiments, if desired. In another embodiment, the processor 32 may be capable of switching the NFC transceiver 31 to the first NFC mode after a particular number of failed attempts by the mobile device 30 to establish NFC communication. That is, the threshold time may be measured or considered as a particular number of attempts that are allowed to establish NFC communication.

In some example embodiments, the particular application that is made active or switched to the foreground may be used not only to determine whether the NFC transceiver 31 should be switched to the first NFC mode, but more particularly to determine how the first NFC mode may be implemented. That is, the processor 32 may advantageously instruct the NFC transceiver 31 whether a P2P or R/W scan mode or a card emulation mode is appropriate based upon the given application that the processor 32 is running in the foreground. For example, if an image file is displayed on the display 34 that the user wishes to transfer to another NFC-enabled device, the processor 32 may advantageously instruct the NFC transceiver to switch to a P2P mode, which may be most appropriate for a media file transfer. In accordance with another example, if a security card has been selected, the processor 32 may instruct the NFC transceiver 31 to switch to a card emulation mode in anticipation of communicating with a security access terminal in R/W mode, for example.

Example components of a mobile wireless communications device 1000 that may be used in accordance with the above-described embodiments are further described below with reference to FIG. 5. The device 1000 illustratively includes a housing 1200, a keyboard or keypad 1400 and an output device 1600. The output device shown is a display 1600, which may comprise a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 5:
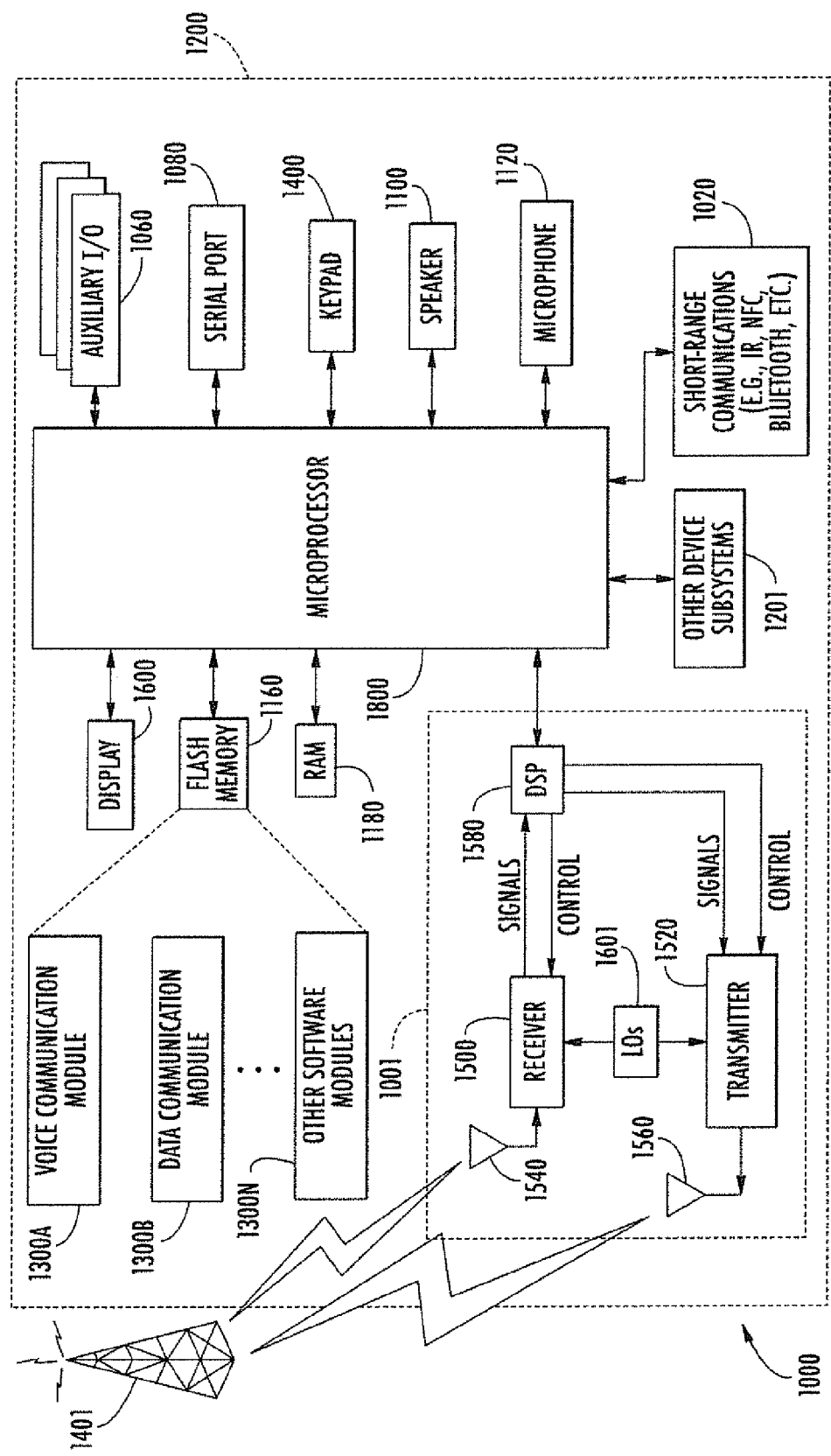
FIG. 5 is a schematic diagram illustrating example components that may be used with the mobile communications devices of FIG. 1, 3, or 4.

In addition to the processing device 1800, other parts of the mobile device 1000 are shown schematically in FIG. 5. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, a Bluetooth™ communications module to provide for communication with similarly-enabled systems and devices, or a near field communications (NFC) sensor for communicating with a NFC transceiver or NFC tag via NFC communications.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A mobile communications device comprising:
   a near field communication (NFC) transceiver switchable between a plurality of modes including a first NFC mode and a second NFC mode, wherein the second NFC mode has a lower power consumption level associated therewith than the first NFC mode; and
   a processor coupled with the NFC transceiver and capable of
      activating an application,
      switching the NFC transceiver to operate in the first NFC mode in response to activating the application, and
      switching the NFC transceiver to the second NFC mode based upon a failure to establish NFC communications within a threshold time of switching the NFC transceiver to the first NFC mode.

2. The mobile communications device of claim 1 wherein the application is capable of using the NFC transceiver; and wherein the processor is capable of switching the NFC transceiver to operate in the first NFC mode further in response to determining that the application is capable of using the NFC transceiver.

3. The mobile communications device of claim 2 wherein the application is capable of using the NFC transceiver by invoking an NFC application programming interface (API).

4. The mobile communications device of claim 3 wherein the processor is capable of switching the NFC transceiver to the first NFC mode further in response to activating the application and the application invoking the NFC API.

5. The mobile communications device of claim 1 wherein the first NFC mode comprises at least one of a peer-to-peer (P2P) mode or a read/write (R/W) mode.

6. The mobile communications device of claim 1 wherein the second NFC mode comprises a low power tag detect mode.

7. The mobile communications device of claim 1 wherein the second NFC mode comprises a passive NFC mode.

8. The mobile communications device of claim 1 wherein the first NFC mode has a first scan rate associated therewith; and wherein the second NFC mode has a second scan rate associated therewith that is lower than the first scan rate.

9. The mobile communications device of claim 1 further comprising an input device coupled with the processor; and wherein the processor is further capable of changing the threshold time based upon the input device.

10. The mobile communications device of claim 9 wherein the input device comprises at least one of a touch screen or a keypad.

11. A communications method for a mobile communications device comprising a near field communication (NFC) transceiver switchable between a plurality of modes comprising a first NFC mode and a second NFC mode, wherein the second NFC mode has a lower power consumption level associated therewith than the first NFC mode, the method comprising:
    activating an application on the mobile communications device;
    switching the NFC transceiver to operate in the first NFC mode in response to activating the application; and
    switching the NFC transceiver to the second NFC mode based upon a failure to establish NFC communications within a threshold time of switching the NFC transceiver to the first NFC mode.

12. The method of claim 11 wherein the application is capable of using the NFC transceiver; and wherein switching the NFC transceiver to operate in the first NFC mode comprises switching the NFC transceiver to operate in the first NFC mode further in response to determining that the application is capable of using the NFC transceiver.

13. The method of claim 12 wherein the application is capable of using the NFC transceiver by invoking an NFC application programming interface (API).

14. The method of claim 13 wherein switching the NFC transceiver to the first NFC mode further comprises switching the NFC transceiver to the first NFC mode in response to activating the application and the application invoking the NFC API.

15. The method of claim 11 wherein the first NFC mode comprises at least one of a peer-to-peer (P2P) mode or a read/write (R/W) mode.

16. The method of claim 11 wherein the second NFC mode comprises a low power tag detect mode.

17. The method of claim 11 wherein the second NFC mode comprises a passive NFC mode.

18. The method of claim 11 wherein the first NFC mode has a first scan rate associated therewith; and wherein the second NFC mode has a second scan rate associated therewith that is lower than the first scan rate.

19. A non-transitory computer-readable medium for a mobile communications device comprising a near field communication (NFC) transceiver switchable between a plurality of modes including a first NFC mode and a second NFC mode, wherein the second NFC mode has a lower power consumption level associated therewith than the first NFC mode, the non-transitory computer-readable medium having computer-executable instructions for causing the mobile communications device to perform steps comprising:
    activating an application on the mobile communications device;
    switching the NFC transceiver to operate in the first NFC mode in response to activating the application; and
    switching the NFC transceiver to the second NFC mode based upon a failure to establish NFC communications within a threshold time of switching the NFC transceiver to the first NFC mode.

20. The non-transitory computer-readable medium of claim 19 wherein the application is capable of using the NFC transceiver; and wherein switching the NFC transceiver to operate in the first NFC mode comprises switching the NFC transceiver to operate in the first NFC mode further in response to determining that the application is capable of using the NFC transceiver.

21. The non-transitory computer-readable medium of claim 20 wherein the application is capable of using the NFC transceiver by invoking an NFC application programming interface (API).

22. The non-transitory computer-readable medium of claim 21 wherein switching the NFC transceiver to the first NFC mode further comprises switching the NFC transceiver to the first NFC mode in response to activating the application and the application invoking the NFC API.

23. The non-transitory computer-readable medium of claim 19 wherein the first NFC mode comprises at least one of a peer-to-peer (P2P) mode or a read/write (R/W) mode.

24. The non-transitory computer-readable medium of claim 19 wherein the second NFC mode comprises a low power tag detect mode.

25. The non-transitory computer-readable medium of claim 19 wherein the second NFC mode comprises a passive NFC mode.

26. The non-transitory computer-readable medium of claim 19 wherein the first NFC mode has a first scan rate associated therewith; and wherein the second NFC mode has a second scan rate associated therewith that is lower than the first scan rate.

* * * * *